United States Patent Office
3,502,667
Patented Mar. 24, 1970

3,502,667
INDOLE DERIVATIVES
Michio Nakanishi and Ryosuke Kobayashi, Nakatsu, and Masahiro Torigoe, Chikujo-gun, Japan, assignors to Yoshitomi Pharmaceutical Industries, Ltd., Osaka, Japan
No Drawing. Filed Mar. 2, 1967, Ser. No. 620,246
Claims priority, application Japan, Mar. 2, 1966, 41/13,094; Dec. 10, 1966, 41/81,197; Dec. 16, 1966, 41/82,570
Int. Cl. C07d 27/56
U.S. Cl. 260—247.2    37 Claims

ABSTRACT OF THE DISCLOSURE

Compounds of the formula

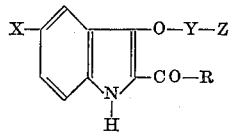

wherein X is H, halogen, lower alkyl or lower alkoxy; Y is $C_2$–$C_4$ alkylene or 2-hydroxytrimethylene; Z is lower alkyl-amino, di-lower alkyl-amino, 1-pyrrolidinyl, piperidino, morpholino or 4-lower alkyl-1-piperazinyl; and R is amino, lower alkyl-amino, hydroxyl or lower alkoxy, are useful as drugs for asthma and as antispasmodics.

---

This invention relates to therapeutically useful indole derivatives of the formula

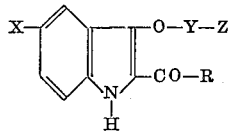

(I)

wherein:

X is H, halogen (e.g. Cl), lower alkyl or lower alkoxy;
Y is $C_2$–$C_4$ alkylene or 2-hydroxytrimethylene;
Z is lower alkyl-amino, di-lower alkyl-amino, 1-pyrrolidinyl, piperidino, morpholino or 4-lower alkyl-1-piperazinyl; and
R is amino, lower alkyl-amino, hydroxyl or lower alkoxy, and pharmaceutically acceptable acid addition salts thereof. The term "lower" means that the alkyl or alkoxy contains not more than four carbon atoms.

The compounds (I) of the invention can be prepared by reacting an indole compound of the formula

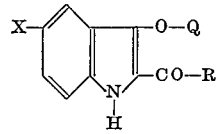

(II)

with a compound of the formula

Q′—Z    (III)

where, in Formulas II and III, X, Z and R are as precedingly defined, and one of Q and Q′ is H and the other is —Y-hal in which "hal" is halogen and Y is as precedingly defined.

The reaction is carried out with or without a solvent. The solvent is, for example, water, methanol, ethanol, acetone, acetonitrile, pyridine, dimethyl sulfoxide, chloroform, diethyl ether, dimethylformamide, benzene, toluene, xylene, dioxane or tetrahydrofuran. The presence of a catalyst such as potassium iodide tends to accelerate the reaction. If necessary, an alkaline or basic substance can be used as an acid acceptor to bind the hydrogen halide formed by the reaction. Such alkaline or basic substance is, for example, an alkaline hydroxide, an alkaline carbonate, an alkaline hydrogen carbonate, an alkaline hydride, an alkaline alkoxide, triethylamine, N,N-dimethylaniline, N,N-diethylaniline, pyridine or another organic base. An excess of the starting amine (III) where Q′ is H can be used also as acid acceptor. When an amine (III) (Q′=H) with a low boiling point is a starting material, the reaction is preferably carried out under pressure in a pressure container or in an autoclave. Moderate heating or warming is favorable for the reaction.

When the starting indole compound (II) is one where R is OH, an ester (in Formula I, R=—O—Y—Z) or an ammonium salt (in Formula I, R=—OH.HZ) is formed. The ester or salt can easily be hydrolyzed, for example, by treatment with an alkaline hydroxide, followed by treatment of the resulting alkaline carboxylate with an acid such as hydrochloric acid.

The compounds of Formula I in which R is OH can also be derived from the corresponding esters (in Formula I, R=lower alkoxy) or amines (in Formula I, R=amino or lower alkyl-amino) by a per se conventional method, and vice versa. The amides can also be prepared from the corresponding lower alkyl esters.

The compounds (I) can be converted to pharmaceutically acceptable acid addition salts such as hydrochloride, sulfate, nitrate, phosphate, formate, acetate, propionate, oxalate, benzoate, salicylate, nicotinate, fumarate, maleate, phthalate, anthranilate, succinate, citrate, glutarate, tartrate, malate and picrate, in per se conventional manner.

The compounds (I) and the pharmaceutically acceptable acid addition salts thereof are all useful as antispasmodic agents and as drugs for the treatment of asthma.

Antihistaminic (Antihist), antiacetylcholine (AntiAch), anti-serotonin (Anti 5HT), and barium chloride antagonizing (Anti Ba$^{++}$) activities of a representative compound of the invention, namely, ethyl 3-(3-dimethylaminopropoxy)-2-indolecarboxylate hydrochloride (IDY-1001), for example, as determined with the isolated intestine of the guinea pig and compared with those of papaverine hydrochloride are as follows (in terms of $ED_{50}$ (mg./kg.)):

|  | IDY-1001 | Papaverine.HCl |
|---|---|---|
| Antihist | 0.2 | 2 |
| AntiAch | 3.5 | 6 |
| Anti 5HT | 6 | 25 |
| Anti Ba$^{++}$ | 9 | 10 |

IDY-1001 shows anti-inflammatory action, oral $ED_{50}$ values to inhibit dextran edema and carrageenin edema in rats being 50 and 100 mg./kg., respectively. Papaverine hydrochloride has no anti-inflammatory activity. Thus, IDY-1001 is especially useful in the treatment of spasms accompanied by inflammation.

Spasmolytic effect in guinea pigs of IDY-1001 based on measurement of brochial volumes after Konzett and Rösseler is shown in the following:

| | $ED_{50}$ (50% protecting dose, mg./kg.) | |
|---|---|---|
| Spasm | IDY-1001 | Ephedrine.HCl |
| Histamine | 0.1 | 12 |
| Acetylcholine | 2.5 | 1.8 |
| Serotonin | 2 | 100 |

The compounds (I) and salts thereof as antispasmodics are administered orally as tablets, parenterally by subcutaneous, intramuscular or intravenous injection, or rectally as suppositories. The usual dose for adults is 10–50 milligrams 3 times daily.

For the treatment of asthma, inhalation of aerosols containing compound (I) or a salt thereof is recommended. The daily usual dose for adults is about 30–150 milligrams.

The following examples represent presently preferred illustrative embodiments.

EXAMPLE 1

A mixture of 35 grams of ethyl 3-hydroxy-2-indolecarboxylate, 22 grams of 3-dimethylaminopropyl chloride, 12 grams of anhydrous potassium carbonate and 100 milliliters of dimethylformamide was heated on a water bath at 70° C., with stirring for 5 hours, and then the reaction mixture was poured into 300 milliliters of ice water. The separated oil layer was taken up with diisopropyl ether, the ether layer extracted with 10% hydrochloric acid, and the extract neutralized with an aqueous solution of potassium carbonate. The separated oil layer was taken up with diisopropyl ether, dried over anhydrous potassium carbonate and treated with a theoretically required amount of ethanolic hydrochloric acid to precipitate ethyl 3-(3-dimethylaminopropoxy)-2-indolecarboxylate hydrochloride. The product was recrystallized from an ethanoldiisopropyl ether mixture to give 34 grams of the purified product with a melting point of 156–157° C. The yield was 65.8%.

*Analysis.*—Calculated for $C_{16}H_{22}N_2O_3 \cdot HCl$ (percent): C, 58.81; H, 7.09; N, 8.57. Found (percent): C, 58.26; H, 6.96; N, 8.67.

EXAMPLE 2

Fifty milliliters of dimethyl sulfoxide was added to a mixture of 4.1 grams of ethyl 3-hydroxyindole-2-carboxylate, 3.5 grams of 2-dimethylaminoethyl chloride hydrochloride and 3 grams of anhydrous potassium carbonate, and the whole was heated at 80° C. on a water bath for 3 hours with stirring. The reaction mixture was cooled, and poured into water. The separated oil was taken up with diisopropyl ether, the extract dried over anhydrous potassium carbonate, the ether distilled off, and the oily residue heated in 2 milliliters of 28% ethanolic hydrochloric acid. After cooling the resultant solution, a small amount of diethyl ether was added to yield a precipitate, which was recrystallized from an ethanol-diisopropyl ether mixture. Thus five grams of ethyl 3-(2-diethylaminoethoxy)-2-indolecarboxylate hydrochloride with a melting point of 125–127° C. was obtained. The yield was 66.2%.

*Analysis.*—Calculated for $C_{17}H_{27}ClN_2O_3$ (percent): C, 59.90; H, 7.39; N, 8.22. Found (percent): C, 59.91; H, 7.27; N, 8.24.

EXAMPLE 3

A mixture of 14 grams of ethyl 3-(3-chloropropoxy)-2-indolecarboxylate, 7 grams of isopropylamine and 50 milliliters of 99% ethanol in a pressure receptacle was heated at 80° C. for 5 hours. To the reaction mixture 200 milliliters of water was added, and the whole was extracted with diisopropyl ether. The extract was dried over anhydrous potassium carbonate, and treated with 38% ethanolic hydrochloric acid. Ethyl 3-(3-isopropylaminopropoxy)-2-indolecarboxylate hydrochloride with a melting point of 215° C. (decomposition) was obtained as a precipitate in 82.3% yield (16 grams).

*Analysis.*—Calculated for $C_{17}H_{25}ClN_2O_3$ (percent): C, 59.90; H, 7.39; N, 8.22. Found (percent): C, 59.75; H, 7.51; N, 8.25.

EXAMPLE 4

A mixture of 5.6 grams of ethyl 3-(3-chloropropoxy)-2-indolecarboxylate, 2 grams of pyrrolidine and 100 milliliters of toluene was heated at 80° C. for 4 hours. The reaction mixture was washed with water and extracted with 10% hydrochloric acid. The extract was made alkaline with 10% aqueous sodium hydroxide solution. The separated oil was taken up with toluene, and the toluene solution, after drying over potassium carbonate, treated with alcoholic hydrochloric acid to give ethyl 3-(3-(1-pyrrolidinyl)propoxy) - 2 - indolecarboxylate hydrochloride. After recrystallization from ethanol the hydrochloride weighed 5.6 grams (75% yield) and melted at 198° C.

*Analysis.*—Calculated for $C_{18}H_{25}ClN_2O_3$ (percent): C, 61.27; H, 7.14; N, 7.94. Found (percent): C, 60.86; H, 7.31; N, 7.76.

EXAMPLE 5

A mixture of 7 grams of 3-(3-chloro-2-hydroxypropoxy) - N - methyl - 2 - indolecarboxamide and 30 milliliters of 35% aqueous methylamine solution in a pressure receptacle was heated at 80° C. for 5 hours. The reaction mixture was poured into 100 milliliters of water and extracted with chloroform. The extract was shaken with 10% aqueous hydrochloric acid, the aqueous layer made alkaline with 10% sodium hydroxide and extracted with chloroform. The chloroform extract was dried over sodium sulfate, then the solvent distilled off, and the residue recrystallized from ethyl acetate to give 3-(2-hydroxy-3-methylaminopropoxy) - 2 - indole - N - methyl - carboxamide melting at 156–159° C. in 51.7% yield.

*Analysis.*—Calculated for $C_{14}H_{19}N_3O_3$ (percent): C, 60.64; H, 6.91; N, 15.15. Found (percent): C, 60.52; H, 6.80; N, 14.87.

The following compounds were obtained in a similar manner as in the foregoing examples (chemical name, melting point and recrystallization solvent being given):

3-(3-dimethylaminopropoxy)-2-indolecarboxamide, 155–157° C., aqueous ethanol;

3-(3-isopropylaminopropoxy)-2-indole-N-methyl-carboxamide, 80–82° C., aqueous ethanol;

ethyl 5-methoxy-3-(3-dimethylaminopropoxy)-2-indolecarboxylate hydrochloride, 147–148° C., ethanol-diisopropyl ether mixture;

ethyl 3-(3-piperidinopropoxy)-2-indolecarboxylate hydrochloride, 208–210° C., ethanol-diisopropyl ether mixture;

3-(2-piperidinopropoxy)-2-indole-N-methyl-carboxamide, whose crystals contain half a molecule of water of crystallization, 198° C., ethanol;

ethyl 3-(3-morpholinopropoxy)-2-indolecarboxylate hydrochloride, 207–208° C., ethanol-diisopropyl ether mixture;

ethyl 3-(2-methyl-3-morpholinopropoxy)-2-indolecarboxylate hydrochloride, 207–209° C., ethanol-diisopropyl ether mixture;

3-(3-morpholinopropoxy)-2-indolecarboxamide, 180–182° C., aqueous ethanol;

ethyl 5-chloro-3-(3-morpholinopropoxy)-2-indolecarboxylate hydrochloride, whose crystals contain ¼ molecule of water of crystallization, 220–220.5° C., ethanol;

ethyl 5-methyl-3-(3-morpholinopropoxy)-2-indolecarboxylate, 119–120° C., ethanol;

ethyl 5-methoxy-3-(3-morpholinopropoxy)-2-indolecarboxylate hydrochloride, whose crystals contain half a molecule of water of crystallization, 182–183° C., ethanol;

ethyl 5-methoxy-3-(2-morpholinoethoxy)-2-indolecarboxylate picrate, 219–220° C., ethanol;

ethyl 3-(3-dimethylaminopropoxy)-5-methyl-2-indolecarboxylate picrate, 171.5–172.5° C.;

ethyl 5-methyl-3-(2-piperidinopropoxy)-2-indolecarboxylate hydrochloride, 213° C., ethanol;

ethyl 3-(3-diethylaminopropoxy)-2-indolecarboxylate hydrochloride, 164° C., ethanol-diisopropyl ether mixture;

ethyl 3-(2-morpholinoethoxy)-2-indolecarboxylate hydrochloride, 208° C., ethanol-diisopropyl ether mixture;

5-methyl-3-(3-morpholinopropoxy)-2-indole-N-methyl-carboxamide, 181–182° C., ethanol;

3-(3-(4-methyl-1-piperazinyl)propoxy)-2-indole-
N-methyl-carboxamide, 115–116° C., diisopropyl
ether;

ethyl 3-(3-(4-methyl-1-piperazinyl)propoxy)-2-
indolecarboxylate dihydrochloride, 250° C.
(decomposition), ethanol-diisopropyl ether mixture;

ethyl 5-methoxy-3-(3-(4-methyl-1-piperazinyl)pro-
poxy)-2-indolecarboxylate dihydrochloride, 226–
227° C., methanol;

ethyl 3-(2-hydroxy-3-dimethylaminopropoxy)-2-
indolecarboxylate hydrochloride, methanol-diiso-
propyl ether mixture;

ethyl 3-(2-hydroxy-3-piperidinopropoxy)-2-
indolecarboxylate hydrochloride, 203° C. (decom-
position with foaming), ethanol;

ethyl 3-(2-hydroxy-3-morpholinopropoxy)-2-
indolecarboxylate hydrochloride, 177–179° C., 95%
ethanol;

ethyl 3-(2-hydroxy-3-(4-methyl-1-piperazinyl)-
propoxy)-2-indolecarboxylate dihydrochloride,
whose crystals contain half a molecule of water of
crystallization, 228–229° C., 95% ethanol.

EXAMPLE 6

A solution of 5.7 grams of 3-(3-chloropropoxy)-2-in-
dolecarboxylic acid and 6 grams of piperidine in 50
milliliters of ethanol was heated with stirring on a water
bath at 50° C. for 5 hours. Then the ethanol was distilled
off, the residue dissolved in a small amount of water, an
aqueous solution containing 0.8 gram of sodium hydrox-
ide added to the solution, the whole evaporated, and the
residue suspended in ethanol. To the suspension there
was added 38% ethanolic hydrochloric acid, the mixture
stirred and filtered to remove insoluble matter, and di-
isopropyl ether added portionwise to the filtrate. The
formed precipitate was recrystallized from an ethanol-di-
isopropyl ether mixture to give 3-(3-piperidinopropoxy)-
2-indolecarboxylic acid hydrochloride melting at 172° C.
with decomposition in 43.4% yield.

*Analysis.*—Calculated for $C_{17}H_{23}ClN_2O_3$ (percent): C,
60.27; H, 6.84; N, 8.27. Found (percent): C, 60.12; H,
6.97; N, 8.10.

EXAMPLE 7

A mixture of 1.4 grams of 3-hydroxy-5-methoxy-2-in-
dolecarboxylic acid, 2.8 grams of potassium carbonate,
1.7 grams of 3-morpholinopropyl chloride and 10 milliters
of dimethylformamide was heated with stirring at 80° C.
for 6 hours. To the reaction mixture there was added an
aqueous solution of 0.2 gram of sodium hydroxide, and
the whole was refluxed for 2 hours, cooled, neutralized
with dilute hydrochloric acid and evaporated to dryness
under reduced pressure. The residue was extracted with
hot ethanol. After removing the ethanol by distillation, the
residue was recrystallized from methanol to give 1.1 grams
of 5-methoxy-3-(3 - morpholinopropoxy) - 2 - indolecar-
boxylic acid melting at 117–119° C. The yield was 45.1%.

*Analysis.*—Calculated for $C_{17}H_{22}O_5N_2$ (percent): C,
61.06; H, 6.63; N, 8.38. Found (percent): C, 60.86; H,
6.80; N, 8.27.

EXAMPLE 8

A solution of 0.5 gram of sodium hydroxide in 3 mil-
liliters of water was added to a solution of 0.6 gram of
ethyl 5-methoxy-3-(3-morpholinopropoxy) - 2 - indolecar-
boxylate in 2 milliliters of water, and the whole refluxed
for 2 hours. Then 5 milliliters of water was added, and the
mixture adjusted to pH 7 with hydrochloric acid. Then
the water was distilled off. The residue was treated as in
Example 7 to give 0.2 gram of 5-methoxy-3-(3-morpho-
linopropoxy) - 2 - indolecarboxylic acid melting at 118–
119° C.

Similarly as in Examples 6, 7 or 8, the following were
prepared:

3-(3-dimethylaminopropoxy)-2-indolecarboxylic acid hy-
drochloride, 148° C. (decomposition), ethanol-diiso-
propyl ether mixture;

3-(3-(1-pyrrolidinyl)propoxy) - 2 - indolecarboxylic acid
(intramolecular salt) whose crystals contain half a
molecule of water of crystallization, 180° C. (decom-
position), ethanol;

3-(3-morpholinopropoxy)-2-indolecarboxylic acid hydro-
chloride, 178° C. (decomposition), methanol-diiso-
propyl ether mixture; and 3-(3-(4-methyl-1-piperazinyl)propoxy)-2 - indolecarbox-
ylic acid dihydrochloride, whose crystals contain 2
molecules of water of crystallization, 120° C. (decom-
position), aqueous ethanol.

EXAMPLE 9

A mixture of 0.7 gram of ethyl 5-methyl-3-(3-morpho-
linopropoxy)-2-indolecarboxylate, 5 milliliters of a 35%
aqueous methylamine solution and 5 milliliters of ethanol
was heated in a pressure receptacle at 95° C. for 15 hours.
The reaction mixture was poured into 100 milliliters of
water, and the precipitate formed was washed with water,
dried and recrystallized from ethanol to give 0.5 gram
(77.2% yield) of 5-methyl-3-(3-morpholinopropoxy)-2-
indole-N-methyl-carboxamide melting at 182° C.

*Analysis.*—Calculated for $C_{18}H_{25}O_3N_3$ (percent): C,
65.23; H, 7.60; N, 12.68. Found (percent): C, 64.98; H,
7.81; N, 12.62.

The following formulae correlate structure and no-
menclature according to the present application.

Example 1.—Ethyl 3-(3-dimethylaminopropoxy)-2-
indolecarboxylate

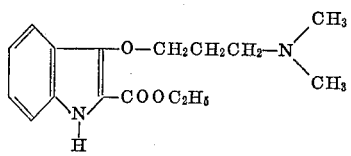

Example 3.—Ethyl 3-(3-isopropylaminopropoxy)-2-
indolecarboxylate

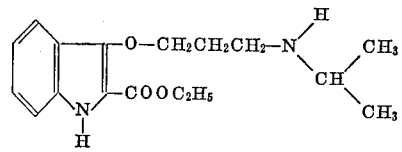

Example 4.—Ethyl 3-(3-(1-pyrrolidinyl)propoxy)-2-
indolecarboxylate

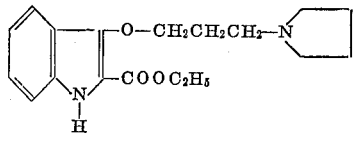

Example 5.—3-(2-hydroxy-3-methylaminopropoxy)-
2-indole-N-methyl carboxamide

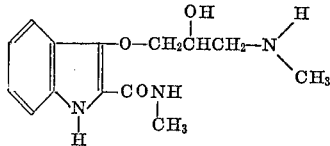

Example 6.—3-(3-piperidinopropoxy)-2-indole-
carboxylic acid

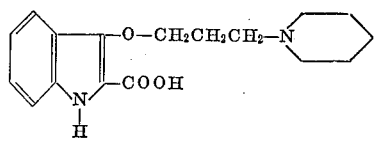

Example 7.—5-methoxy-3-(3-morpholinopropoxy)-
2-indolecarboxylic acid

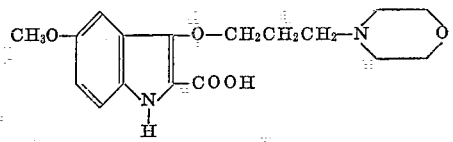

Example 9.—5-methyl-3-(3-morpholinopropoxy)-
2-indole-N-methyl carboxamide

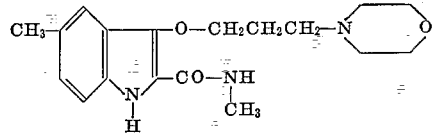

Having thus disclosed the invention, what is claimed is:

1. A member selected from the group consisting of compounds of the formula

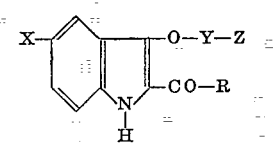

and the pharmaceutically acceptable acid addition salts thereof, wherein

X is H, halogen, alkyl or alkoxy,
Y is $C_2$–$C_4$ alkylene,
Z is alkyl-amino, di-alkyl-amino, 1-pyrrolidinyl, piperidino, morpholino or 4-lower alkyl-1-piperazinyl, and
R is amino, alkyl-amino, hydroxyl or alkoxy;

"alkyl" and "alkoxy" in each occurrence thereof containing not more than four carbon atoms.

2. A compound according to claim 1, said compound being in the form of a hydrochloride.

3. A compound according to claim 1, said compound being ethyl 3 - (3-dimethylaminopropoxy)-2 - indolecarboxylate.

4. A compound according to claim 1, said compound being ethyl 3 - (3 - isopropylaminopropoxy)-2-indolecarboxylate.

5. A compound according to claim 1, said compound being 3 - (3 - dimethylaminopropoxy) - 2 - indolecarboxamide.

6. A compound according to claim 1, said compound being 3 - (3 - isopropylaminopropoxy) - N - methyl - 2-indolecarboxamide.

7. A compound according to claim 1, said compound being ethyl 3 - (3 - dimethylaminopropoxy) - 5 - methoxy-2-indolecarboxylate.

8. A compound according to claim 1, said compound being ethyl 3 - (3 - pyrrolidino)propoxy) - 2 - indolecarboxylate.

9. A compound according to claim 1, said compound being ethyl 3 - (3 - piperidinopropoxy) - 2 - indolecarboxylate.

10. A compound according to claim 1, said compound being ethyl 3 - (3 - diethylaminopropoxy) - 2 - indolecarboxylate.

11. A compound according to claim 1, said compound being ethyl 3 - (3 - morpholinopropoxy) - 2 - indolecarboxylate.

12. A compound according to claim 1, said compound being ethyl 3 - (2 - methyl - 3 - morpholinopropoxy) - 2-indolecarboxylate.

13. A compound according to claim 1, said compound being ethyl 3 - (3 - (4 - methyl - 1 - piperazinyl) - propoxy)-2-indolecarboxylate.

14. A compound according to claim 1, said compound being 3 - (3 - morpholinopropoxy) - 2 - indolecarboxamide.

15. A compound according to claim 1, said compound being 3 - (2 - piperidinopropoxy) - 2 - indole - N - methylcarboxamide.

16. A compound according to claim 1, said compound being 3 - (3 - (4 - methyl - 1 - piperazinyl)propoxy) - 2-indole-N-methyl-carboxamide.

17. A compound according to claim 1, said compound being ethyl 5 - chloro - 3 ( 3 - morpholinopropoxy) - 2-indolecarboxylate.

18. A compound according to claim 1, said compound being ethyl 5 - methyl - (3 - (3 - morpholinopropoxy) - 2-indolecarboxylate.

19. A compound according to claim 1, said compound being ethyl 5 - methoxy - 3 - (3 - morpholinopropoxy) - 2-indolecarboxylate.

20. A compound according to claim 1, said compound being ethyl 5 - methoxy - 3 - (3 - (4 - methyl - 1 - piperazinyl)propoxy)-2-indolecarboxylate.

21. A compound according to claim 1, said compound being 5 - methyl - 3 - (3 - morpholinopropoxy) - 2 - indole-N-methyl-carboxamide.

22. A compound according to claim 1, said compound being ethyl 5 - methoxy - 3 - (2 - morpholinoethoxy) - 2-indolecarboxylate.

23. A compound according to claim 1, said compound being 3 - (3 - piperidinopropoxy) - 2 - indolecarboxylic acid.

24. A compound according to claim 1, said compound being 3 - (3 - dimethylaminopropoxy) - 2 - indolecarboxylic acid.

25. A compound according to claim 1, said compound being 3 - (3 - (1 - pyrrolidinyl)propoxy) - 2 - indolecarboxylic acid.

26. A compound according to claim 1, said compound being 3 - (3 - morpholinopropoxy) - 2 - indolecarboxylic acid.

27. A compound according to claim 1, said compound being 3 - (3 - (4 - methyl - 1 - piperazinyl)propoxy) - 2-indolecarboxylic acid.

28. A compound according to claim 1, said compound being 5 - methoxy - 3 - (3 - morpholinopropoxy) - 2 - indolecarboxylic acid.

29. A compound according to claim 1, said compound being ethyl 3 - (3 - dimethylaminopropoxy) - 5 - methyl-2-indolecarboxylate.

30. A compound according to claim 1, said compound being ethyl 5 - methyl - 3 - (2 - piperidinopropoxy) - 2-indolecarboxylate.

31. A compound according to claim 1, said compound being ethyl 3 - (3 - dimethylamino - 2 - hydroxypropoxy)-2-indolecarboxylate.

32. A compound according to claim 1, said compound being ethyl 3 - (2 - hydroxy - 3 - piperidinopropoxy) - 2-indolecarboxylate.

33. A compound according to claim 1, said compound being ethyl 3 - (2 - hydroxy - 3 - morpholinopropoxy) - 2-indolecarboxylate.

34. A compound according to claim 1, said compound being ethyl 3 - (2 - hydroxy - 3 - (4 - methyl - 1 - piperazinyl)propoxy)-2-indolecarboxylate.

35. A compound according to claim 1, said compound being 3 - (2 - hydroxy - 3 - methylaminopropoxy) - N-methyl-2-indolecarboxamide.

36. A compound according to claim 1, said compound being ethyl 3 - (2 - diethylaminoethoxy) - 2 - indolecarboxylate.

37. A compound according to claim 1, said compound being ethyl 3 - (2 - morpholinoethoxy) - 2 - indolecarboxylate.

References Cited

UNITED STATES PATENTS 3,376,300  4/1968  Shen _____ 260—247.2

ALEX MAZEL, Primary Examiner

A. M. T. TIGHE, Assistant Examiner

U.S. Cl. X.R.

260—268, 294, 294.3, 295.5, 326.13, 326.14; 424—232, 248, 250, 266, 267, 274